(12) United States Patent
Masek

(10) Patent No.: US 9,170,785 B1
(45) Date of Patent: Oct. 27, 2015

(54) PARAMETERIZATION ON THE FLY

(71) Applicant: CA, Inc., Islandia, NY (US)

(72) Inventor: Lukas Masek, Pencin (CZ)

(73) Assignee: CA, Inc., Islandia, NY (US)

( * ) Notice: Subject to any disclaimer, the term of this patent is extended or adjusted under 35 U.S.C. 154(b) by 310 days.

(21) Appl. No.: 13/826,406

(22) Filed: Mar. 14, 2013

(51) Int. Cl.
*G06F 9/45* (2006.01)
*G06F 9/44* (2006.01)

(52) U.S. Cl.
CPC ........................................ *G06F 8/36* (2013.01)

(58) Field of Classification Search
None
See application file for complete search history.

(56) References Cited

U.S. PATENT DOCUMENTS 6,292,885 B1 * 9/2001 Nakai et al. ................... 712/219

* cited by examiner

*Primary Examiner* — Chuck Kendall
(74) *Attorney, Agent, or Firm* — Stevens & Showalter, LLP

(57) ABSTRACT

Generating a parameter value for an executable statement includes, in a plurality of statements, identifying an input statement that provides input information and an output statement associated with the input statement; wherein the output statement comprises a reference to a temporary data set and another of the plurality of statements also includes a parameter reference to the temporary data set. The method also includes modifying the input information to produce modified input information; and outputting the modified input information to the temporary data set.

30 Claims, 3 Drawing Sheets

PARAMETERIZATION ON THE FLY

BACKGROUND

The present disclosure relates to symbolic parameters, and more specifically, to assigning values to these parameters on the fly.

One example operating-system-level programming language includes Job Control Language (JCL) which allows a user to provide a set of statements to an operating system about work that the user wants performed. The set of statements can be referred to as a "job". These statements tell the operating system where to find appropriate input, how to process that input (e.g., what other program or programs to execute), and what to do with the resulting output.

In some environments such as, for example, software quality assurance or software testing, a number of jobs appear very similar except for minor changes to input and output file names. In other words, the executed steps are very similar but those steps might be performed with different input files and produce different output files whose file names may be similar to one another. In such circumstances, it is beneficial to develop techniques and methods to reuse as much of the programming code as possible to avoid developing, or redeveloping, programming code unnecessarily.

BRIEF SUMMARY

According to one aspect of the present disclosure, a system for generating a parameter value for an executable statement that includes a processor and a memory coupled to the processor, the memory configured to store program code executable by the processor. In particular, the program code is configured, when executed by the processor, to identify, in a plurality of statements, an input statement that provides input information and an output statement associated with the input statement; wherein the output statement comprises a reference to a temporary data set and another of the plurality of statements also includes a parameter reference to the temporary data set. The program code is also configured, when executed by the processor, to modify the input information to produce modified input information; and to output the modified input information to the temporary data set.

According to another aspect of the present disclosure, a method of generating a parameter value for an executable statement that includes, in a plurality of statements, identifying by the computer, an input statement that provides input information and an output statement associated with the input statement; wherein the output statement comprises a reference to a temporary data set and another of the plurality of statements also includes a parameter reference to the temporary data set. The method also includes modifying, by the computer, the input information to produce modified input information; and outputting, by the computer, the modified input information to the temporary data set.

According to another aspect of the present disclosure, a computer program product for generating a parameter value for an executable statement that includes a computer readable storage medium having computer readable program code embodied therewith. This computer readable program code includes computer readable program code configured to identify, in the plurality of statements, an input statement that provides input information; and computer readable program code configured to identify, in the plurality of statements, an output statement associated with the input statement; wherein the output statement comprises a reference to a temporary data set and another of the plurality of statements also includes a parameter reference to the temporary data set. The computer readable program code also includes computer readable program code configured to modify the input information to produce modified input information; and computer readable program code configured to output the modified input information to the temporary data set.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
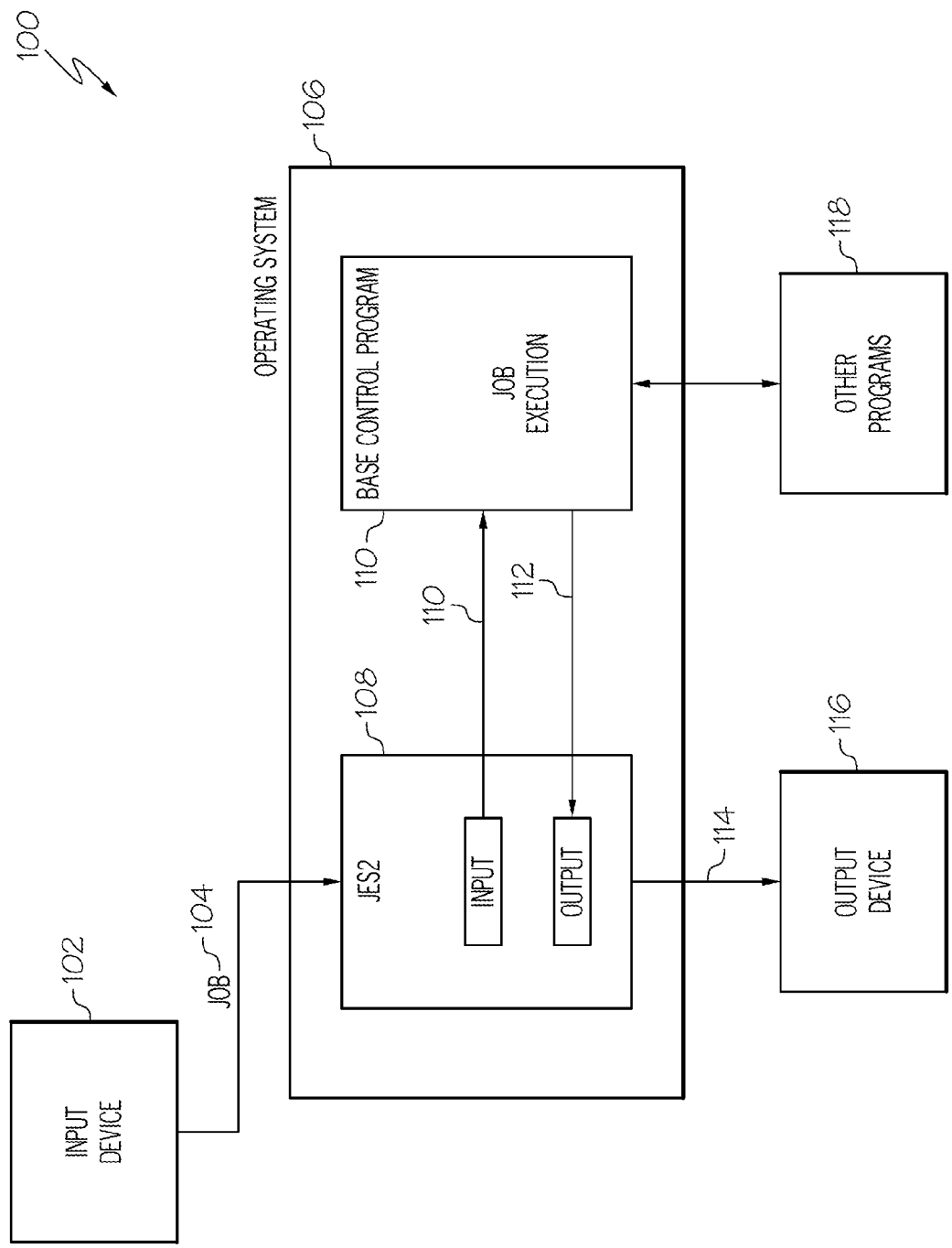
FIG. 1 illustrates an example computing environment that includes programming code in accordance with the principles of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including MAINFRAME Assembler, an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In the example description provided below, parameter values are assigned during execution of a set of executable statements. For clarity, specific examples are provided with JCL code that is being handled by a job entry system such as, for example, JES2. These examples are not intended to limit the aspects of the present disclosure just to JCL statements, the JES2 system, nor the MVS or z/OS operating system. One of ordinary skill will readily recognize that the principles of the present disclosure can be realized in other programming environments than those explicitly discussed in the examples below. Also, example features of JCL are explained so as to enhance understanding of the principles of the present disclosure. One of ordinary skill will also recognize that these example JCL statements and example utilities (e.g., IDCAMS) are provided to show how the principles can be applied in specific instances and are not meant to limit the application of these principles to only these examples.

FIG. 1 illustrates an example computing environment that includes programming code in accordance with the principles of the present disclosure. In the environment 100 a user can utilize an input device 102 to submit a job 104 to the operating system 106. The input device 102 can include, for example, such devices as keyboards, consoles, terminals, and stored sets of executable statements.

The job 104 can include multiple JCL statements that tell the operating system 106 (e.g., MVS, or z/OS) where to find appropriate input data, how to process that input, and what to do with the output that results from processing the input data. The JCL statements can reference external programs 118 that can perform the actual processing of the input data and produce the output.

An operating system 106 such as, for example MVS, can include a job entry subsystem such as, for example, JES2 108. JES2 108 receives jobs into the operating system 106, schedules them for processing by the operating system 106, and controls the job's output processing. In other words, JES2 108 provides the necessary functions to get jobs into, and output out of, the operating system 106.

JES2 108 accepts jobs 104 in the form of an input stream from an input device 102. As JES2 108 reads the input stream, it assigns a job identifier to each job and places each job's SYSIN data onto data sets called spooled data sets. JES2 108 then selects jobs from the spool data sets for processing and subsequent running. JES2 uses a converter program to analyze each job's JCL statements and merges them with system library JCL statements. This composite JCL is then stored by JES2 on the spool data set. Assuming there are no errors in the statements, JES2 queues the job for execution. The Base Control Program 110 can then initiate processing of a job and, in so doing, requests input 110 from JES2 and sends output to JES2. JES2 108 controls all SYSOUT processing which involves system-produced output produced by, or for, a job 104. This output 114 can include system messages and data sets requested by a user. After a job finishes, JES2 analyzes the output 114 and queues it for transmission to various output devices 116.

The following discussion of a specific example of JCL code assumes that the following knowledge on the part of the reader. A DD statement identifies input and output data sets. More generally, these statements specify where to find input data and where to place resulting output data. A DD statement that includes an ' *' positional parameter denotes the beginning of an in-stream data set. The DD statement can also include a number of keywords such as DISP which denotes the data set disposition parameter, DSN (or DSNAME) which specifies the name of the data set, SYSIN which relates to passing data into a program, and SYSOUT which specifies a system output data set and class.

An EXEC statement provides the name of an application or JCL procedure that the system is to run or execute. A single job may include multiple EXEC statements. The STEPLIB DD statement, which can be placed just after an EXEC statement, specifies a library that should be searched first for the program executed by the EXEC statement. Temporary data sets are used for storage needed only for the duration of a job. If a DISP parameter is not included to delete the data set by the end of the job, the system deletes it automatically. A data set can be denoted as a temporary by coding a DSN=&&dsname.

In the following JCL statements, the IDCAMS utility is being executed in such a way as to delete and un-catalog the data set "PUBLIC.TEST.DUMMY.FILE".

```
//DELDSN        EXEC PGM=IDCAMS,REGION=6000K
//SYSPRINTDD    SYSOUT=*
//SYSIN         DD    *
DELETE         (PUBLIC.TEST.DUMMY.FILE)
```

These statements can be modified to include a symbolic variable "&DSNNAME" as shown below:

```
//     SET      DSNNAME=PUBLIC.TEST.DUMMY.FILE
/*
//DELDSN        EXEC PGM=IDCAMS,REGION=6000K
//SYSPRINTDD    SYSOUT=*
//SYSIN         DD    *
DELETE         (&DSNNAME.)
```

In the above code, a symbolic variable "DSNNAME" is included. The first statement sets, or assigns, a value to the symbolic variable. When use of the symbolic variable occurs in the last statement, the "&DSNNAME." is replaced with the assigned value. Thus, the code in this second example accomplishes the same functionality as the first example. However, if the symbolic variable DSNNAME were used multiple times in the second example, then the second example would allow the assigned value to be easily changed in one place (i.e., the first statement) but the effect would be felt at each occurrence of &DSNNAME in later statements.

Symbolic substitution as described above is a powerful addition for creating reusable code that can be applied to many different situations. However, JCL limits what parameters can be referred to with a symbolic variable. Accordingly, there are limits to what information in the statements can be substituted with a symbolic variable.

Thus, additional ways to pass information to executable statements have been developed that allow additional options for parameters that can be changed in order to allow programmable code to be more easily used under different circumstances. For example, JCL allows a parameter list to be passed to applications or procedures called with an EXEC statement, as shown below:

```
//     SET      DSNNAME=TEMP.WORK.DSNAME
/*
//     INITCAMS EXEC PGM=UTILITY, PARM=&DSNNAME
. . . .
```

In the above snippet, the value "TEMP.WORK.DSNAME" is passed to the application entitled "UTILITY" when the statement "INITCAMS" is executed. While this functionality allows a way for some additional elements of the statements to be substituted with symbolic variables, there are some shortcomings. In particular, with JCL, there is a limit that the value assigned to DSNNAME is limited to 128 characters in length.

In accordance with the principles of the present disclosure, the example code that follows provides a technique for including symbolic variables within the programming statements at almost any location so that the values for the symbolic variables are substituted during execution to create parameters on-the-fly that can be used within other programmable statements as well.

```
//   SET         DSNNAME1=PUBLIC.TEST.DUMMY.FILE
//   SET         DSNNAME2=OTHER.DUMMY.FILE
//INITCAMSEXEC   PGM=JCLSET
//STEPLIB        DD      DISP=SHR,DSN=SHARE.UTIL.BIN
//SYSPRINT       DD      SYSOUT=*
//I001           DD      *
     DELETE (&DSNNAME1.)
//O001           DD      DSN=&&MSPRM1,
                         DCB= (RECFM=FB,LRECL=80,BLKSIZE=800),
                         SPACE= (CYL,(1,1)),DISP= (NEW,PASS,DELETE)
//DELDSN         EXEC PGM=IDCAMS,REGION=6000K
//SYSPRINTDD     SYSOUT=*
//SYSIN          DD      DISP=SHR,DSN=&&MSPRM1
//
//I002           DD      *
     DELETE (&DSNNAME2.)
/*
//O002           DD           DSN=&&MSPRM2,
                 DCB=         (RECFM=FB,LRECL=80,BLKSIZE=800),
                              SPACE= (CYL,(1,1)),DISP= (NEW,PASS,DELETE)
  . . .
//I003           DD      *
     CREATE (&DSNNAME1.)
//O003           DD      DSN=&&MSPRM3,
                 DCB=    (RECFM=FB,LRECL=80,BLKSIZE=800),
                         SPACE= (CYL,(1,1)),DISP= (NEW,PASS,DELETE)
  . . .
```

In the above programming statements, there are two symbolic variable used DSNNAME1 and DSNNAME2. Both are included to indicate that the principles of the present disclosure are not limited to a single instance of a symbolic variable. One of ordinary skill will recognize that a plurality of different symbolic variable could be used, as well, in accordance with the principles of the present disclosure.

Of significance is a pair of matched I/O statements that can be identified by their respective labels "I001" and "O001".

The label, or identifier, for these statements can be constructed a variety of different ways and the specific labels shown above are provided merely by way of example. Each label includes a first letter, either "I" or "O", which indicates that the statement is either an input or output statement, respectively. The next portion of both labels includes three digits "001". In this way, the labels identify a matching pair of statements because they each have a respective portion equal to each other. In JCL, for example, a label can be eight characters long so a possible label could be "I0000003" with seven of the digits allowing a user to uniquely identify matched pairs of statements. By way of example, a second pair of matched I/O statements are includes as well and are denoted by "I002" and "O002".

In the above examples of names for the pair of matched I/O statements, numbers were used as example ways to match an "I" statement with an "O" statement. However, these labels can include any allowable characters. For example, "IALPHA@" and "OALPHA@" would be matching statements as would "IALPHA4" and "OALPHA4".

In operation, when the application "JCLSET" is executed it expects input according to the 1000 statement and produces output to be used by the 0000 statement. In addition, any symbolic variables in the input are replaced with their respective values. Thus, the application JCLSET is passed, as input:

DELETE (PUBLIC.TEST.DUMMY.FILE)

This input data is then output by the application JCLSET and based on the output statement O001 becomes the temporary data set having a name &&MSPRM1. This temporary data set is utilized as a parameter reference in a subsequent statement within the example set of programming statements. In particular, the temporary data set is used to specify a parameter used in conjunction with a utility application known as IDCAMS.

The statement "//SYSIN DD DISP=SHR, DSN=&&MSPRM1" when executed will have the temporary data set "&&MSPRM1" used as a parameter for the IDCAMS application. In particular, the output statement "O001" causes the temporary data set to include, in part: "DELETE(PUBLIC.TEST.DUMMY.FILE". Thus, using this technique, a compound parameter for the IDCAMS application was generated on the fly during execution that includes one portion "DELETE" that is not a symbolic variable and a second portion "PUBLIC.TEST.DUMMY.FILE" that is the value of a symbolic variable. This temporary dataset &&MSPRM1 could be used by additional, subsequent statements as well with similar substitution steps occurring.

As shown, in part, there can be another symbolic variable DSNNAME2 that is the subject of its own matched pair of I/O statements (I002 and O002). The output statement "O002" would generate a different temporary data set &&MSPRM2 that would be used as a compound parameter by some subsequent statement (not shown). Also, as shown, the first symbolic variable "DSNNAME1" can also be a part of a third matched pair of I/O statements to create a different, compound parameter to be used by some subsequent statement (not shown).

Figure 2:
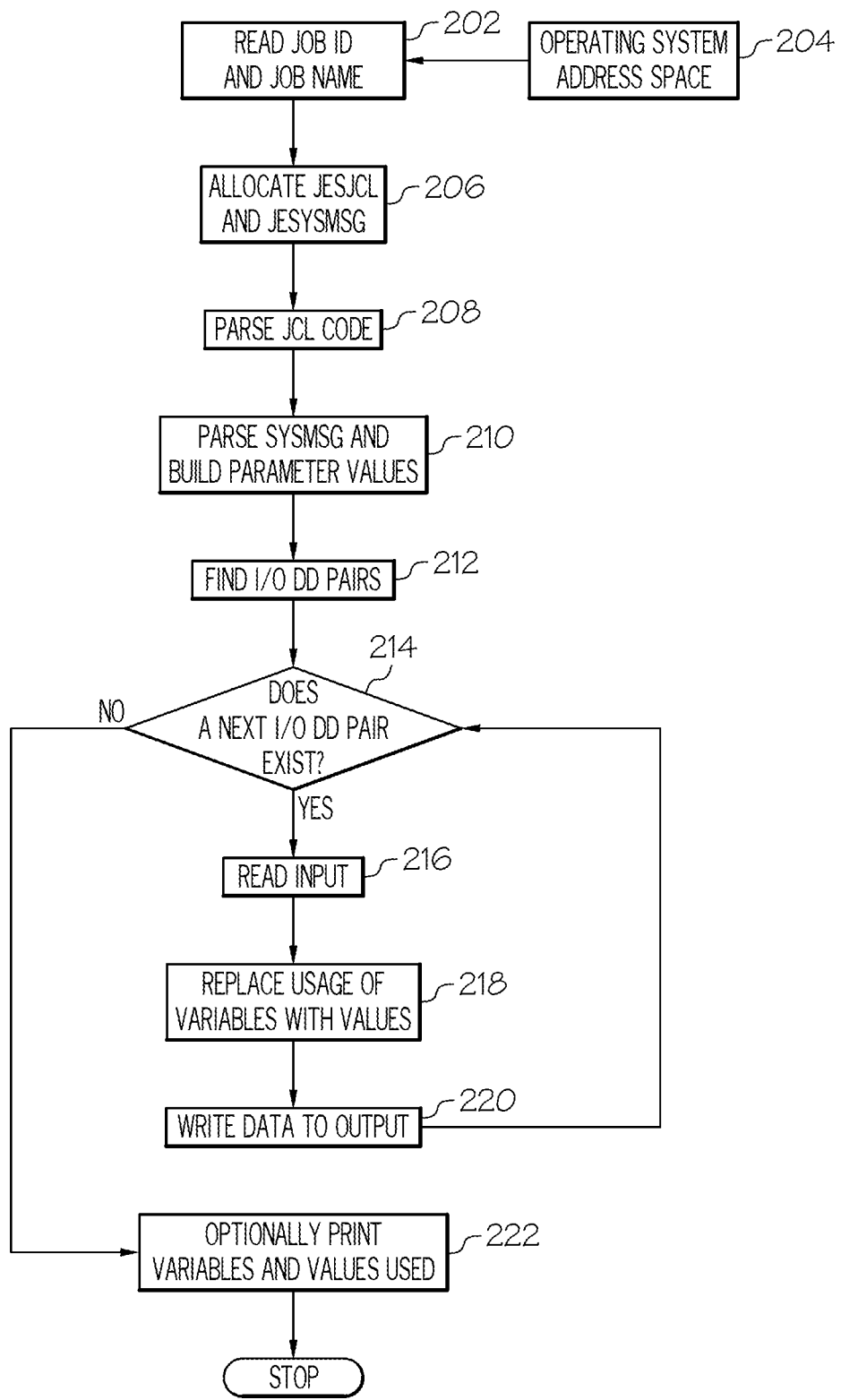
FIG. 2 illustrates a flowchart of an exemplary method for parameterization on the fly in accordance with the principles of the present disclosure.

FIG. 2 illustrates a flowchart of an exemplary method for parameterization on the fly in accordance with the principles of the present disclosure. Assuming, for example, that the process of FIG. 2 is performed within a JES2 and z/OS environment on a set of JCL statements that comprise a JOB. A JOBID and JOBNAME are read, in step 202, from the operating system address space 204. The JES2 system, in step 206, allocates various information in memory such as, for example, JESJCL and JESYSMSG. This information allows extraction of a variety of information from the JCL statements and the execution environment. In step 208 and 210 the JES2 system parses the JCL code and identifies symbolic variables and their values. Using this information, a table can be created that maps a symbolic variable name to its assigned value.

Next, an application can be executed (e.g., the JCLSET application described above) that is designed to recognize matched pairs of I/O statements in the JCL statements based on naming convention. In other words, the application automatically recognizes that input received from a DD line labeled "I00x" will produce output that is to be provided to a DD line labeled "O00x". The application determines the matched pairs that exist, in step 212, and then performs a number of steps for each matched pair. In the flowchart of FIG. 2, the step 214 is used to determine when all the matched pairs have been processed.

Thus, the application reads, in step 216, the input information from a DD line named according to the predetermined naming convention and, in step 218, symbolic variables within that input are replaced with their values that can be extracted from the map to produce modified input information. Next, in step 220, the modified input information is written as output data to the appropriately labeled output statement. The "modified input data" or "modified input information" was referred to above as a compound parameter that could be used in other JCL statements. It is "compound" because it can have a portion not related to a symbolic variable (e.g., DELETE) and another portion related to a symbolic variable (e.g. (&DSNNAME.). It is modified because the value "PUBLIC.TEST.DUMMY.FILE" is substituted for the symbolic variable name DSNNAME in the output.

The output from the application can be written as output to a temporary data set that can be referred to in subsequent JCL statements in the JOB. Once all the matched pairs of I/O statements are processed, the application can provide a listing, in step 222, of all the symbolic variables that were identified in the JOB and the substitution values that were used. The symbolic variable can include system or environment variables as well, not just those explicitly recited in the JOB. For example, the SYSUID, JOBID, JOBNAME and other system parameters related to date and time can be listed as well.

Because the application that recognizes and process the matched pairs of I/O statements need not be constrained with the same rules and limitations of JCL, the information in the input DD statement can include forbidden syntax or other characters that are not allowed in JCL. The application would be designed to handle any non-standard syntax and provide output in a format that is acceptable to be used in subsequent JCL statements.

Figure 3:
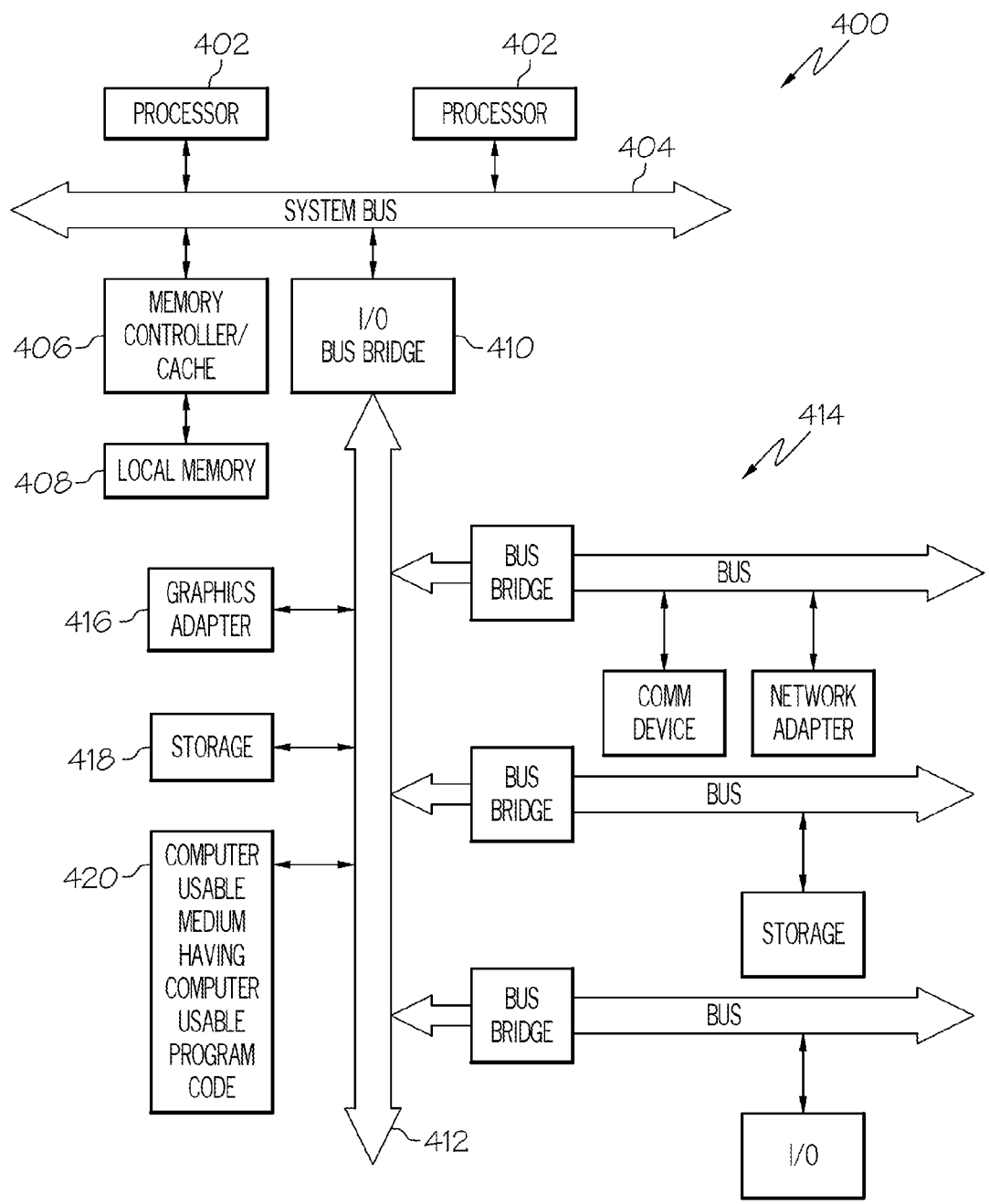
FIG. 3 illustrates a block diagram of a data processing system in accordance with the principles of the present disclosure.

Referring to FIG. 3, a block diagram of a data processing system is depicted in accordance with the present disclosure. A data processing system 400, such as may be utilized to implement the hardware platform 108 or aspects thereof, e.g., as set out in greater detail in FIG. 1A-FIG. 2, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1A-FIG. 2.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of generating a parameter value for an executable statement, comprising:
   in a plurality of program statements, identifying by a data processing system, an input statement,
      wherein the input statement comprises input information;
   in the plurality of program statements, identifying by the data processing system, an output statement associated with the input statement; wherein:
      the output statement comprises a reference to a temporary data set, and
      another of the plurality of program statements also includes a parameter reference to the temporary data set;
   modifying, by the data processing system, the input information to produce modified input information,
      wherein the modifying comprises performing symbolic substitution on at least a portion of the input information; and
   outputting according to the output statement, by the data processing system, the modified input information to the temporary data set.

2. The method of claim 1, wherein the plurality of program statements comprise JCL statements.

3. The method of claim 2, wherein the input statement and the output statement each comprise DD statements.

4. The method of claim 1, wherein the input statement and the output statement are associated with each other because each comprises a respective associated identifier.

5. The method of claim 4, wherein a portion of each of the respective identifiers are the same.

6. The method of claim 1, wherein the input information includes:
   a first portion that does not comprise a symbolic variable; and
   a second portion comprising a symbolic variable; and
      wherein the modifying comprises performing symbolic substitution of the symbolic variable.

7. The method of claim 1, comprising:
   identifying in the plurality of program statements a symbolic variable and an associated value for the symbolic variable.

8. The method of claim 7, wherein the input statement comprises the symbolic variable.

9. The method of claim 8, wherein modifying further comprises:
   substituting the associated value for the symbolic variable.

10. The method of claim 7, comprising:
    outputting, by the data processing system, a message identifying the symbolic variable and the associated value.

11. A system for generating a parameter value for an executable statement, comprising:
    a processor and a memory coupled to the processor, the memory configured to store program code executable by the processor;
    the program code configured, when executed by the processor, to identify, in a plurality of program statements, an input statement, wherein the input statement comprises input information;
    the program code configured, when executed by the processor, to identify, in the plurality of program statements, an output statement associated with the input statement; wherein:
       the output statement comprises a reference to a temporary data set, and
       another of the plurality of program statements also includes a parameter reference to the temporary data set;
    the program code configured, when executed by the processor, to modify the input information by performing symbolic substitution on at least a portion of the input information to produce modified input information; and
    the program code configured, when executed by the processor, to output according to the output statement the modified input information to the temporary data set.

12. The system of claim 11, wherein the plurality of program statements comprise JCL statements.

13. The system of claim 12, wherein the input statement and the output statement each comprise DD statements.

14. The system of claim 11, wherein the input statement and the output statement are associated with each other because each comprises a respective associated identifier.

15. The system of claim 14, wherein a portion of each of the respective identifiers are the same.

16. The system of claim 11, wherein the input information includes:
- a first portion that does not comprise a symbolic variable; and
- a second portion comprising a symbolic variable; and
    - wherein the performing symbolic substitution comprises performing symbolic substitution of the symbolic variable.

17. The system of claim 11, wherein the program code is further configured, when executed by the processor, to identify in the plurality of program statements a symbolic variable and an associated value for the symbolic variable.

18. The system of claim 17, wherein the input statement comprises the symbolic variable.

19. The system of claim 18, wherein the modified input information comprises the associated value substituted for the symbolic variable in the input information.

20. The system of claim 17, wherein the program code is further configured, when executed by the processor, to output a message identifying the symbolic variable and the associated value.

21. A computer program product for generating a parameter value for an executable statement, comprising:
- a computer readable storage medium having computer readable program code embodied therewith, the computer readable program code comprising:
    - computer readable program code configured to identify, in the plurality of program statements, an input statement, wherein the input statement comprises input information;
    - computer readable program code configured to identify, in the plurality of program statements, an output statement associated with the input statement; wherein:
        - the output statement comprises a reference to a temporary data set, and
            - another of the plurality of program statements also includes a parameter reference to the temporary data set;
    - computer readable program code configured to modify the input information by performing symbolic substitution on at least a portion of the input information to produce modified input information; and
    - computer readable program code configured to output according to the output statement the modified input information to the temporary data set.

22. The computer program product of claim 21, wherein the plurality of program statements comprise JCL statements.

23. The computer program product of claim 22, wherein the input statement and the output statement each comprise DD statements.

24. The computer program product of claim 21, wherein the input statement and the output statement are associated with each other because each comprises a respective associated identifier.

25. The computer program product of claim 24, wherein a portion of each of the respective identifiers are the same.

26. The system of claim 21, wherein the input information includes:
- a first portion that does not comprise a symbolic variable; and
- a second portion comprising a symbolic variable; and
    - wherein the performing symbolic substitution comprises performing symbolic substitution of the symbolic variable.

27. The computer program product of claim 21, comprising:
- computer readable program code configured to identify in the plurality of program statements a symbolic variable and an associated value for the symbolic variable.

28. The computer program product of claim 27, wherein the input statement comprises the symbolic variable.

29. The computer program product of claim 28, wherein the modified input information comprises the associated value substituted for the symbolic variable in the input information.

30. The computer program product of claim 27, comprising:
- computer readable program code configured to output a message identifying the symbolic variable and the associated value.

* * * * *